United States Patent
Nakamura

(10) Patent No.: US 7,408,318 B2
(45) Date of Patent: Aug. 5, 2008

(54) MOTOR DRIVE UNIT

(75) Inventor: Masahiro Nakamura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 156 days.

(21) Appl. No.: 10/599,114

(22) PCT Filed: Apr. 5, 2005

(86) PCT No.: PCT/JP2005/006993

§ 371 (c)(1),
(2), (4) Date: Sep. 20, 2006

(87) PCT Pub. No.: WO2005/101644

PCT Pub. Date: Oct. 27, 2005

(65) Prior Publication Data

US 2007/0171584 A1    Jul. 26, 2007

(30) Foreign Application Priority Data

Apr. 15, 2004 (JP) .............................. 2004-120474

(51) Int. Cl.
*G05B 1/06* (2006.01)
(52) U.S. Cl. ............. 318/662; 318/400.21; 318/400.31; 318/701; 318/782
(58) Field of Classification Search ................. 318/662, 318/400.21, 400.31, 701, 782, 794
See application file for complete search history.

(56) References Cited

U.S. PATENT DOCUMENTS

2006/0109702 A1* 5/2006 Weightman .................. 363/149

FOREIGN PATENT DOCUMENTS

JP    07-131995 A    5/1995
JP    09-051189 A    2/1997

OTHER PUBLICATIONS

International Search Report issued in the corresponding International Application No. PCT/JP2005/006993, mailed on Jun. 14, 2005.

* cited by examiner

*Primary Examiner*—Karen Masih
(74) *Attorney, Agent, or Firm*—Keating & Bennett, LLP

(57) ABSTRACT

A motor drive unit is adapted to detect a motor lock-up condition (in which an electric motor is accidentally locked during driving) based on the fact that motor drive current increases in that event. Then, a capacitor for generating a voltage signal is charged with an arbitrarily adjustable charging current to overcome the motor lock-up. To do this, an IC is formed to incorporate therein such components as a first discharging circuit for discharging the electric charge of the capacitor and a hysteresis-type comparison circuit for comparing the charging current with a threshold level to thereby adjust the charging current suitable for the motor used. Such a versatile IC as described above enables adjustment of the motor startup trial period for individual motors having different characteristics.

14 Claims, 5 Drawing Sheets

MOTOR DRIVE UNIT

BACKGROUND OF THE INVENTION

1. Field of the Invention

This invention relates to a motor drive unit for driving an electric motor (hereinafter simply referred to as motor) such as a fan motor provided in a computer, a switchboard, and a printer, and more particularly to a motor drive unit having a motor lock-up detection circuit.

2. Description of the Related Art

FIG. 4 is a schematic diagram showing a general arrangement of a motor drive unit equipped with a conventional motor lock-up detection circuit. Shown in FIG. 4 is a 2-phase motor 1 for rotating a fan. A resistor 2a, a Hall device 2, and a resistor 2b are connected in series between a power supply voltage Vdd and the ground. The rotational condition of the motor 1 is detected by the Hall device 2. The output signal of the Hall device 2 is fed to a semiconductor integrated circuit (IC) 100, which is adapted to drive drive-transistors 9a and 9b.

A first-stage amplifier 3 amplifies the output of the Hall device 2, and outputs a rotational signal A. A mid-stage amplifier 4 further amplifies the rotational signal A and supplies it to a control circuit 5. The control circuit 5 generates a 2-phase drive signal based on the signal received from the mid-stage amplifier 4 and a reference signal. This drive signal is supplied to the drive-transistors 9a and 9b. Element 8 is a diode.

These components constitute a feedback loop for driving the motor 1 with a 2-phase half-wave driving signal in response to the rotational signal A. In a steady state, the motor 1 maintains a rotation at a substantially constant speed determined by the characteristics of the feedback loop.

An anomalous condition can take place where the fan is temporarily stopped or locked up by, for example, an obstacle accidentally hitting the fan. Under such lock-up condition, the rotational signal A will not change. As a consequence, the control circuit 5 remains locked up in a fixed output status. Thus, the motor 1 is either continually supplied with electric power or no longer supplied with any electric power from the control circuit 5.

If electric power is continually supplied to the stopped motor 1, excessive current will flow through it, thereby resulting in abnormal heating and eventual destruction of the motor 1. On the other hand, when no electric power is supplied to the motor 1, it cannot restore its rotational motion even after the obstacle is removed. In any event, accidental stopping of the motor entails adverse consequences.

To cope with such disadvantage, motor drive units are normally provided with an automatic return signal generation circuit 6 and a capacitor 7 for detecting lock-up condition and fulfilling automatic restoration function. Although the capacitor 7 collaborates with the automatic return-signal generation circuit 6, it is (usually) provided as an external component to be mounted outside the IC 100. However, when the electric capacity of the capacitor 7 is small, it may be built in the IC 100. For example, it may be included in the automatic return signal generation circuit 6.

The first-stage amplifier 3, mid-stage amplifier 4, control circuit 5, and automatic return signal generation circuit 6 are built in the IC 100, and connected to external elements via associated pins P1 and P2 (for hole signals), pin P3 (for capacitor 7), and pins P4 and P5 (for drive signals), as shown.

The automatic return signal generation circuit 6 monitors the rotational condition of the motor 1 based on the rotational signal A received. When it is detected that the rotation of the motor 1 has stopped, the circuit 6 starts and continues generating an automatic return signal E until the motor 1 resumes rotation. The automatic return signal E alternately assumes an ON state for a predetermined period (referred to as startup trial (re-startup) period) and an OFF state for another predetermined period (referred to as dormant period) as determined by the automatic return signal generation circuit 6 and the capacitor 7.

In the event that the motor 1 is stopped, the automatic return signal E is used instead of the control signal of the amplifier 4, in the control circuit 5 to restart the motor 1. For example, startup trial operation of about 0.5 second is repeatedly tried in each of startup trial periods, interlaced with dormant periods of about 3 second each, until the motor 1 restores its rotational motion.

As a result, unless the motor 1 is broken in the accident, it can recover a rotational motion as soon as a rotatable condition is restored. Incidentally, the lengths of a startup trial period and a dormant period are determined in accordance with the characteristics of the motor in question.

Referring to FIG. 5, there is shown an exemplary arrangement of a conventional automatic return signal generation circuit 6. The capacitor 7 has a capacitance of 1 µF, for example, which generates a triangular or sawtooth charging and discharge voltage signal (hereinafter referred to as charging-discharging voltage signal) C as it is charged and discharged. A first constant current circuit 63 is adapted to supply charging current Ic1 of 3 µA, for example, to the capacitor 7. A second constant current circuit 64 is adapted to supply discharging current Id of 3.5 µA for example from the capacitor 7.

A comparison circuit 65 provides a HIGH (H) level comparison output D when the voltage of the charging-discharging voltage signal C inputted thereto exceeds a given operational threshold level of, for example, about 2.5 V, and provides a LOW (L) level comparison output D when the voltage of the charging-discharging voltage signal C is below a predetermined return threshold level, which is, for example, about, 1 V. A second switching circuit SW2 turns on or off the discharging current from the second constant current circuit 64 according to the level of the comparison output D. These elements constitute an oscillation circuit. In the example shown herein, the oscillatory charging-discharging voltage signal C thus obtained is an asymmetrical triangular wave signal that takes about 0.5 seconds to rise and about 3 seconds to fall.

In response to a rotational signal A, the pulse generation circuit 61 generates a pulse signal B having the same frequency as the rotational signal A. Upon receipt of a pulse signal B, the first switch SW1 instantly discharges the charged capacitor 7.

Because of these switches being connected to the oscillation circuit, when the motor 1 is in steady rotation, a pulse signal B is generated with a period of cycle in accord with the short period of the rotational signal A, thereby repeating discharging the capacitor 7 with that short period. Accordingly, while the motor 1 is in steady rotation, the oscillation of the charging-discharging voltage signal C is suppressed, so that the signal C turns out to be a sawtooth wave that oscillates slightly about "0 level". As a result, the comparison output D of the comparison circuit 65 remains at "L level".

On the other hand, if the motor 1 is stopped, the rotational signal A will not vary any longer, which causes the pulse signal B to be stopped, which in turn causes the oscillation circuit to start its own oscillation as stated above. That is, the charging-discharging voltage signal C becomes an asymmetrical triangular wave signal that rises for about 0.5 seconds and falls for about 3 seconds. The comparison output D of the comparison circuit 65 also becomes a similar pulse wave having the same period of oscillation as the charging-discharging signal C. Thus, whether the motor 1 is in the rotational state or in a locked-up condition or not can be detected from the difference in waveform of the charging-discharging voltage signal C. In this sense a so-called lock-up detection function can be fulfilled by the charging-discharging circuit.

A waveform shaping circuit 66 reshapes the waveform of the charging-discharging voltage signal C to provide a pulsed automatic return signal E. This automatic return signal E has alternating "H" startup trial period (each lasting about 0.5 second) and "L" dormant periods (each lasting about 3 seconds). This automatic return signal E is outputted after detection of the stopping of the motor 1 and until the motor 1 restores its rotational motion. So-called automatic return function is achieved in this way by generating such automatic return signal E.

In the automatic return signal generation circuit 6 shown in FIG. 5, current levels of the first and second constant current circuits 63 and 64, respectively, cannot be made very high. Therefore, in order to obtain required lengths of startup trial period and dormant period, it is necessary to make large the capacitance of the capacitor 7. In an effort to reduce the capacitance of the capacitor, Japanese Patent Application Laid Open H7-131995 (hereinafter referred to as Patent Document 1) discloses an automatic return signal generation circuit 6 equipped with an oscillation circuit for instantly discharging the capacitor by means of the comparator 65, a counter for counting the output of the comparator 65, and a comparator for generating an automatic return signal E based on the comparison of the count of the counter with a predetermined value.

It is noted that this prior art automatic return signal generation circuit has a limitation that each of the startup trial periods and the dormant periods has a fixed length (e.g. Startup trial period is about 0.5 sec and dormant period is about 3 sec) as set in accordance with the characteristics of the motor 1 used. Hence, the ratio of the two periods (defined to be the ratio of the startup trial period divided by the dormant period) is fixed to a predetermined value.

The startup trial period, dormant period, and the ratio are optimized for the type of the motor 1 to be used. Thus, there is a problem with prior art automatic return signal generation circuits that an IC 100 must have an automatic return signal generation circuit 6 optimized for that particular type of the motor used.

Although the first and second constant current circuits 63 and 64, respectively, can be modified to provide variable current levels so that the startup trial period and the dormant period, and hence the ratio thereof, can be varied, such modification raises the cost of the IC 100.

SUMMARY OF THE INVENTION

It is, therefore, an object of the present invention to provide a motor drive unit for driving a motor, said drive unit implemented in the form of an IC having an automatic return signal generation circuit for detecting, and restoring the motor from, a lock-up condition of said motor, said motor drive unit characterized in that said automatic return signal generation circuit is equipped with a lock-up detection circuit capable of adjusting the lengths of its startup trial periods and dormant periods, and hence the ratio thereof, for multiple types of motors having different characteristics individually, thereby rendering said automatic return signal generation circuit adaptable to those motors.

In accordance with one aspect of the invention, there is provided a motor drive unit adapted to generate a motor drive signal for rotating a motor when said motor is in rotational motion, but, when said motor is detected to be in a lock-up condition, stop said motor drive signal in dormant periods and generate said motor drive signal in startup trial periods, said startup trial periods interlaced with said dormant periods.

This motor drive unit comprises:

a capacitor which is charged and discharged to generate a voltage signal in accord with the electric charge stored in said capacitor;

a hysteresis-type comparator for generating a comparison output upon detection of said voltage signal reaching a predetermined threshold level;

a first charging circuit for charging said capacitor with first charging current when the drive current supplied to said motor has exceeded a predetermined level; and a first discharging circuit for discharging said capacitor with said first discharging current based on said comparison output.

In this motor drive unit, the dormant periods are periods of time in which said comparison output is generated, and the startup trial periods are periods of time in which said comparison output is not generated.

In accordance with another aspect of the invention, there is provided a motor drive unit adapted to generate a motor drive signal for rotating a motor when said motor is in rotational motion, but, when a motor lock-up condition is detected, stop said motor drive signal in dormant periods and generate said motor drive signal in startup trial periods, said startup trial periods interlaced with said dormant periods, said motor drive unit characterized by comprising:

a capacitor which is charged and discharged to generate a voltage signal in accord with the electric charge stored in said capacitor;

a hysteresis-type comparator for generating a comparison output upon detection of said voltage signal reaching a predetermined threshold value;

a first charging and discharging circuit (hereinafter referred to as charging-discharging circuit) for charging said capacitor with second charging current and for discharging said capacitor in cycles with a period that is in accord with the rotational speed of said motor when said motor is in a rotational motion, thereby charging and discharging the capacitor in voltage range below said threshold level;

a first charging circuit for charging said capacitor with first charging current when said motor drive current has exceeded a predetermined level; and a first discharging circuit for discharging said capacitor with said first discharging current based on said comparison output, and characterized in that said dormant periods are those periods in which said comparison output is generated, and said startup trial periods are those periods in which said comparison output is not generated.

The motor lock-up condition may be detected by the fact that said comparison output is generated during driving said motor.

The first charging circuit may include a voltage dropping circuit for generating a voltage drop associated with the drive current supplied to said motor;

a switching circuit switched by a voltage in accord with said voltage drop; and a current regulation circuit connected in series with said switching circuit, and adapted to regulate said first charging current.

The voltage dropping circuit has a resistor. The switching circuit has a switching transistor. The current regulation circuit has a resistor.

The first charging circuit may include a voltage dropping circuit for generating a voltage drop in accordance with the drive current supplied to said motor; and a constant-current source switchable by a voltage associated with said voltage drop to supply said first charging current.

The first discharging circuit may have a constant current circuit for supplying said first discharging current.

While said comparison circuit and first discharging circuit are built in one semiconductor integrated circuit (IC), said capacitor and said first charging circuit may be provided outside said IC.

While at said comparison circuit, first charging-discharging circuit, and first discharging circuit are built in one semiconductor integrated circuit (IC), said capacitor and first charging circuit may be provided outside said IC.

A motor drive unit of this invention detects a motor lock-up condition based on the fact that the level of the motor drive current becomes higher than that under a normal operating condition. In the event of a motor lock-up, the capacitor generating a voltage signal is charged with an arbitrarily adjustable charging current. To do this, a versatile IC is formed to incorporate therein such components as a first discharging circuit for discharging the electric charge of the capacitor with a predetermined discharging current, a hysteresis-type comparison circuit for generating a comparison output, a first charging-discharging circuit for charging and discharging the capacitor in the voltage range below a predetermined threshold level of the comparison circuit. This versatile IC may be coupled to an external capacitor and an external first charging circuit to form an inventive motor drive unit. Thus, the inventive motor drive unit can adjust the charging current in accordance with the motor used.

Accordingly, the length of a startup trial period as well as the ratio thereof to that of a dormant period can be adjusted for different types of motors having different characteristics individually. It should be noted that conventional motor drive units having fixed startup trial periods and dormant periods cannot cope with a lock-up condition of a motor whose the drive current exceedingly increases under the lock-up condition, and that present invention can extend the applicability of a motor drive unit to any type of motors.

It should be appreciated that, if the automatic return signal generation circuit for enabling the motor to recover from a motor lock-up condition is integrated in an IC, the circuit can be still applied to different types of motors having different characteristics, so that motor drive units can be standardized in accordance with the invention.

DETAILED DESCRIPTION OF PREFERRED EMBODIMENTS

Figure 1:
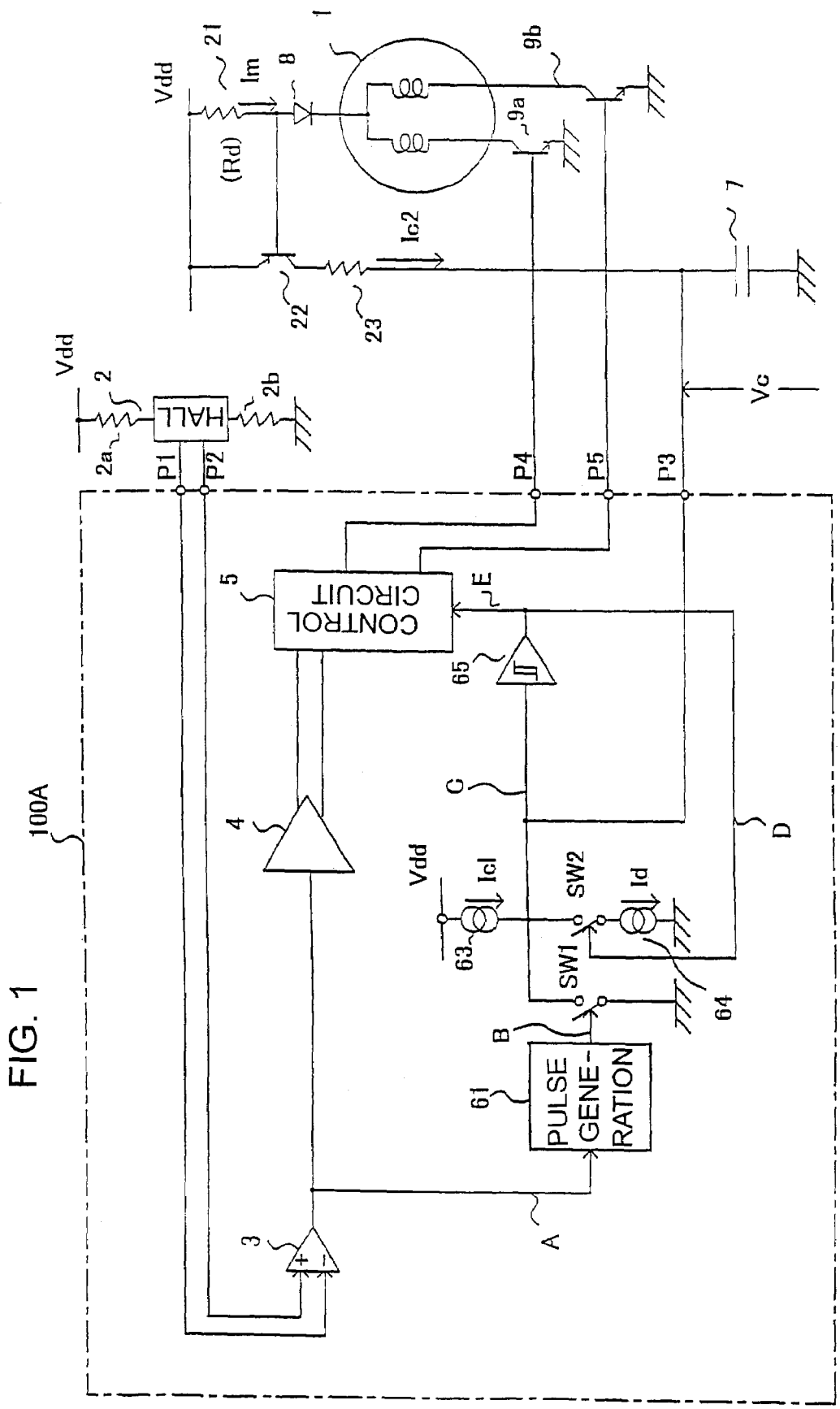
FIG. 1 shows the arrangement of a motor drive unit in accordance with a first embodiment of the invention.
Figure 2:
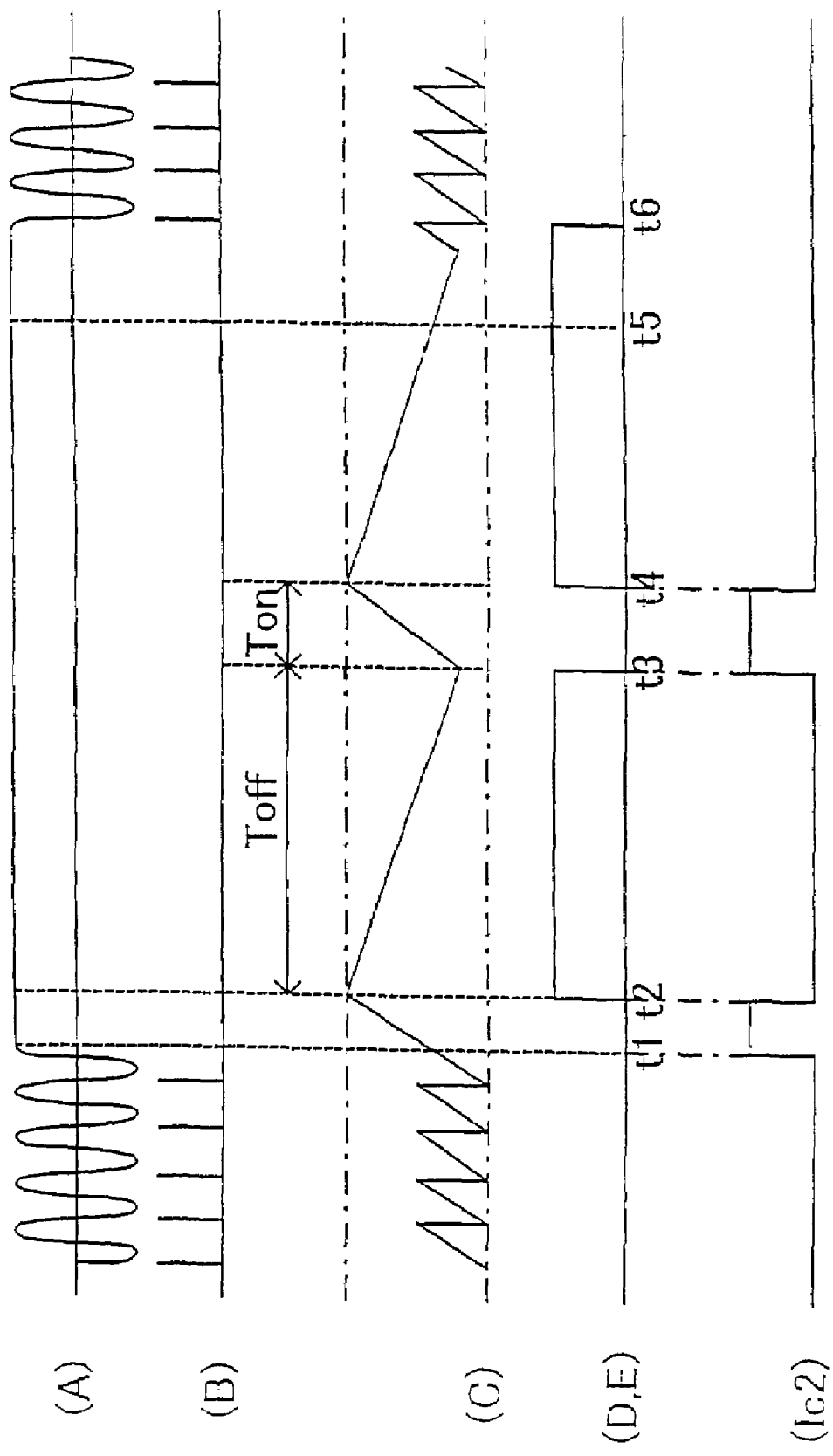
FIG. 2 is a timing chart illustrating operation of the motor drive unit shown in FIG. 1.

An inventive motor drive unit will now be described with reference to the accompanying drawings. Referring to FIG. 1, there is shown the arrangement of a motor drive unit in accordance with a first embodiment of the invention. FIG. 2 is a timing chart illustrating operation of the motor drive unit shown in FIG. 1.

Figure 4:
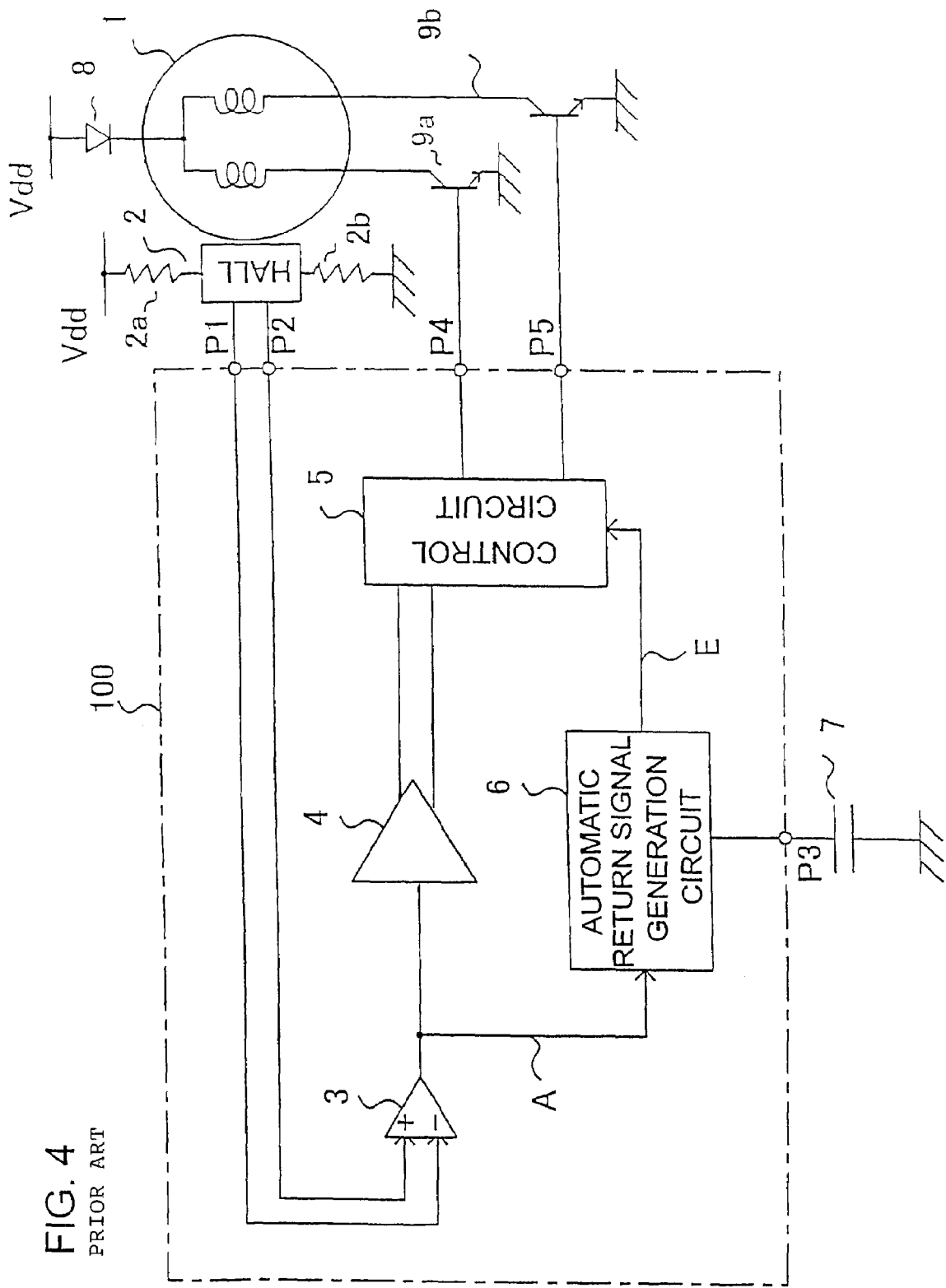
FIG. 4 shows a general arrangement of a motor drive unit equipped with a conventional motor lock-up detection circuit.
Figure 5:
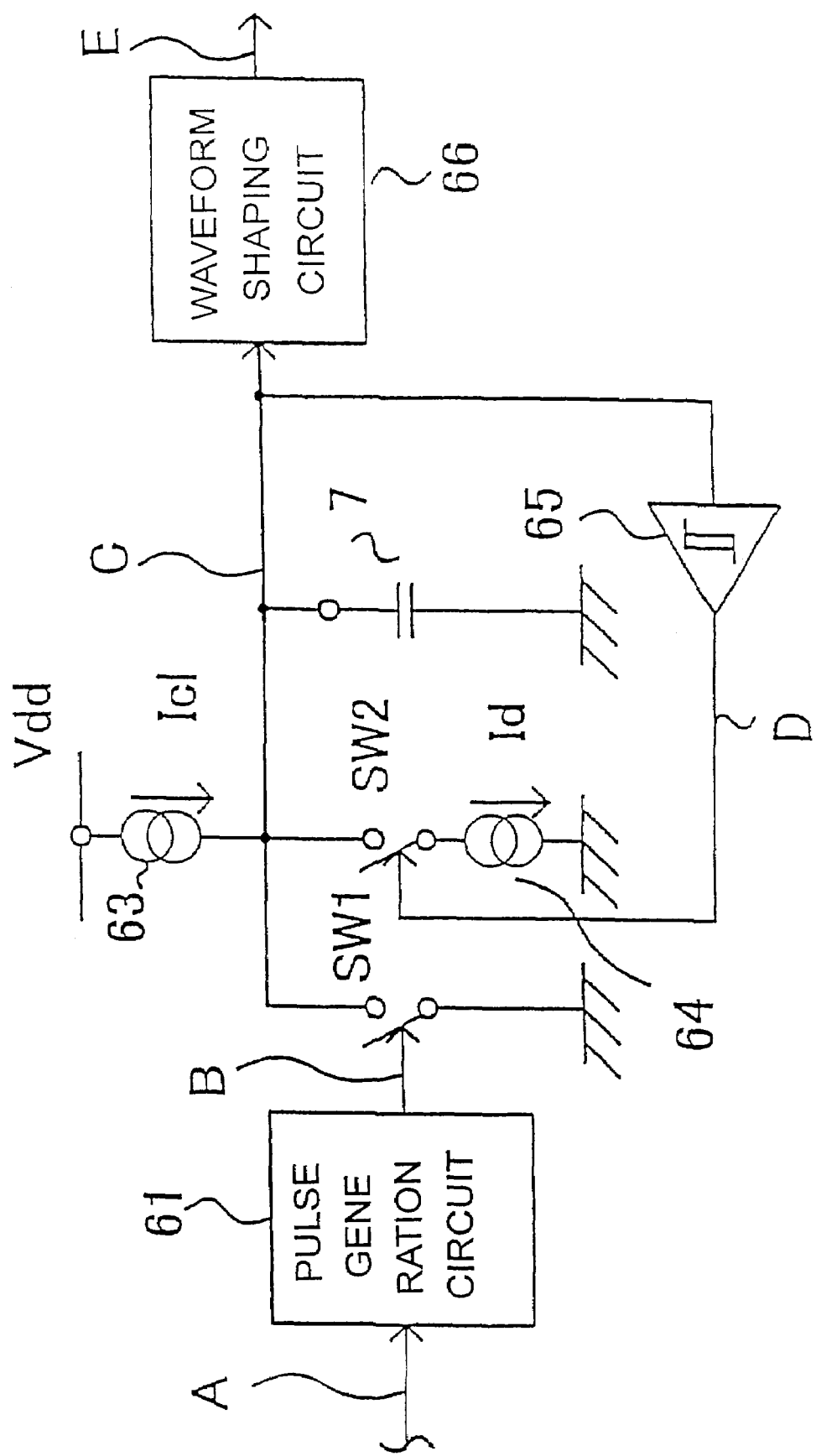
FIG. 5 shows an exemplary automatic return signal generation circuit of FIG. 4.

Those elements shown in FIG. 1 similar to those of the conventional unit shown in FIGS. 4 and 5 are designated by the same reference numerals, and further descriptions thereof will be omitted.

An IC 100A of FIG. 1 is shown to incorporate an automatic return signal generation circuit that is equivalent to the automatic return signal generation circuit 6 of FIG. 5. This IC 100A differs from the IC of FIG. 5 in that the comparison output D of the comparison circuit 65 is used not only as a switching signal for the second switch SW2, but also as an automatic return signal E. As a consequence, the length of a dormant period of the automatic return signal E being at "H level" becomes equal to the length of a discharging period of the capacitor, which enables accurate determination of the dormant period.

The pulse generation circuit 61, first switch SW1, and first constant current circuit 63 for supplying a constant charging current Ic1 in the IC 100A together constitute a first charging-discharging circuit for charging and discharging the capacitor 7. The second switch SW2 and second constant current source 64 for supplying constant discharging current Id together constitute the first charging-discharging circuit.

In order to measure the magnitude of drive current Im through the motor 1, there is provided in the path of the drive current Im a resistor 21 (of resistance Rd), which generates a voltage drop in accord with the drive current Im. This resistor 21 functions as a voltage drop circuit. It is noted that this voltage drop circuit can be a MOS transistor, for example, that has ON-resistance that generates a voltage drop proportional to the motor drive current Im.

A PAP transistor 22 serving as a switching circuit and a resistor 23 serving as a current regulating element are connected in series within a path of the second charging current to the capacitor 7. The voltage drop Im×Rd generated across the resistor 21 is impressed across the emitter and the base of the PAP transistor 22. If this voltage drop Im×Rd exceeds the emitter-base voltage Be of the PAP transistor 22, the PAP transistor 22 will be turned on.

If the motor 1 is locked up, the motor drive current Im will grow much larger than the normal level of the load current. As an example, supposing that the normal level of the motor drive current Im is 300 MA, the level of the motor drive current Im during a motor lock-up will be 600 MA or more. Therefore, the resistance of the resistor 21 and the operational threshold level Be of the PAP transistor 22 are determined such that the PAP transistor 22 will be turned on by the voltage drop due to the drive current during a lock-up.

As the PAP transistor 22 turns on, the resistor 23 and the capacitor 7 are connected between the power supply voltage Vdd and the ground via the PAP transistor 22. Thus, charging current Inc. Of a magnitude determined mainly by the resistance of the resistor 23 flows into the capacitor 7 while the PAP transistor 22 is turned on.

The resistor 21, PAP transistor 22, and resistor 23 constitute a first charging circuit for supplying charging current Inc. under a lock-up condition.

The resistance of the resistor 23 is adjusted in accordance with the type and characteristics of the motor 1 to be driven so that appropriate lengths of a startup trial period and a dormant period, as well as the ratio thereof, can be set up.

It should be understood that the PAP transistor 22 and resistor 23 could be replaced by a constant current circuit adapted to provide a predetermined constant current in accordance with the voltage drop. In this case, the level of the charging current Inc. can be set more accurately.

The magnitude (Ic1+Inc.) Of the charging current Ic1 plus the charging current Inc. is appropriately adjusted to the level that ensures a predetermined startup trial period based on of the threshold level of the comparison circuit 65. The level of the discharging current Id is set larger than that of the charging current Ic1 (Id>Ic1) in accordance with a required length of the dormant periods.

Incidentally, as in the prior art the motor drive unit shown in FIG. 5, the motor drive unit of the invention may incorporate a waveform shaping circuit 66 for reshaping the waveform of the charging-discharging voltage signal C (having a charging voltage of Vc) to output a pulsed automatic return signal E.

It should be understood that, although the invention has been described above with reference to a 2-phase motor 1, the motor drive unit could be applied to other types of motors including a single-phase motor and a 3-phase motor.

Referring to the timing chart of FIG. 2, operation of the motor drive unit of FIG. 1 will now be described.

In a steady state operation, the motor 1 continues a rotational motion at a substantially constant speed determined by the characteristics of the feedback loop of the drive unit, so that the pulse generation circuit 61 outputs a pulse signal B in response to the rotational signal A from the Hall device 2.

The capacitor 7 is charged by charging current Ic1 from the first constant current circuit 63, whereas the first switch SW1 is periodically turned on by the pulse signal B with a period of cycle determined by the rotational frequency of the motor, so that the electric charge of the capacitor 7 is discharged each time the switch SW1 is turned on. Therefore, the charging-discharging voltage signal C remains low, never reaching the threshold level of the comparison circuit 65. Under this condition, charging current Inc. does not flow.

At time t1, an anomalous condition takes place in which the fan of the fan motor 1 is blocked by a hitting obstacle, result in a lock-up of the fan motor 1, which in turn causes the rotation signal A to become invariable. As a consequence, normal drive control of the motor by the control circuit 5 will be lost. In this case, since the motor 1 remains immovable despite rotation commands being repeatedly supplied to the motor 1, an excessive drive current (motor lock-up current) usually flows through the motor. If such motor lock-up condition continues, the motor will overheat and will break down.

When the motor 1 is locked up, the first switch SW1 is no longer turned on, which prevents the electric charge in the capacitor 7 from being discharged via the first switch SW1. Consequently, the capacitor 7 will be charged on by the charging current Ic1 from the first constant current circuit 63.

On the other hand, under such motor lock-up condition, the motor drive current Im becomes larger, thereby increasing the voltage drop across the resistor 21 until it turns on the PAP transistor 22. Then, the charging current Inc. flows through the resistor 21, which causes the capacitor 7 to be charged by a joint current (Ic1+Inc.) Of the charging current Inc. and the charging current Ic1.

As the charge voltage Vc of the capacitor 7 reaches the threshold level of the comparison circuit 65 at time t2, the comparison output D of the comparison circuit 65 and the automatic return signal E will go up to H level. Thus, the lock-up condition of the motor 1 placed under motor driving condition can be detected at time t2, based on the fact that the comparison output D and automatic return signal E are generated at time t2.

As the automatic return signal E goes up to H level, the control operation of the control circuit 5 is turned off, thereby cutting off the motor drive current Im.

When the comparison output D goes down to H level, the second switch SW2 turns on to discharge the capacitor 7. The discharging process depends on the difference between the discharging current Id and charging current Ic1. Therefore, the length of a dormant period Toff, which equals the period of time that the charging voltage Vc of the capacitor 7 falls from the return threshold level of the comparison circuit 65 down to the return threshold level (from t2 to t3 in the example shown herein), can be accurately determined.

At time t3, both the comparison output D and the automatic return signal E drop again below L level, which causes the second switch SW2 to turn off and enables the control circuit 5 to restore its control capability. This permits the motor drive unit to enter a startup trial period Ton, and causes the motor drive current Im to flow. Charging of the capacitor 7 by the join current of charging current Ic1 and the charging current Inc. is resumed at time t3. The charge voltage Vc reaches the operational threshold level of the comparison circuit 65 at time t4.

The length of the startup trial period Ton (t3→t4) varies with the resistance of the resistor 23. Therefore, it is necessary to adjust the resistance of the resistor 23 according to the type of the motor 1 used. Thus, the startup trial period Ton and the dormant period Toff, and their ratio as well, can be optimized in accordance with the type of the motor.

Since the resistor 23 is an external element provided outside the IC 100A, it can be replaced by an appropriate one as needed. Therefore, this IC 100A can be used as a versatile IC with different types of motors 1.

Next, if the source of the lock-up condition is removed during a startup trial period Ton or a dormant period Toff, the motor 1 will return to the usual (normal) rotational operation. For example, when the source of the lock-up condition is removed at time t5 during a dormant period Toff, the motor awaits the end of the dormant period Toff and returns to the normal operating condition at time t6, as shown in FIG. 2. If the lock-up condition is removed during a startup trial period Ton, the motor returns to its normal operation instantly at that moment.

In this way, a motor lock-up condition is detected by means of the voltage dropping circuit (resistor) 21 and the switching circuit (PAP transistor) 22 by taking advantage of the fact that the drive current Im of the motor 1 increases as compared with the drive current during a normal operating condition. The capacitor 7 is charged with the current, which is adjusted by the current adjustment circuit (resistance) 23 to generate the voltage signal C (or charging voltage Vc). It should be noted that if the first electric discharging circuit for discharging the capacitor 7 and the hysteresis-type comparison circuit 65 generating a comparison output D are built in an IC 100A, along with the first charging-discharging circuit (pulse generation circuit 61, first constant current circuit 63, and first switch SW1), charging current can be adjusted by means of an external current adjusting circuit in accordance with individual types of motors 1.

Using such IC as described above, the startup trial period Ton and the ratio of the startup trial period Ton to the dormant period Toff can be adjusted for individual types of motors 1 having different characteristics. Accordingly, the invention has a broad range of applicability to different types of motors and can overcome a lock-up current problem that cannot be overcome by conventional motor drive units having a fixed ratio of startup trial period Ton to dormant period Toff.

Figure 3:
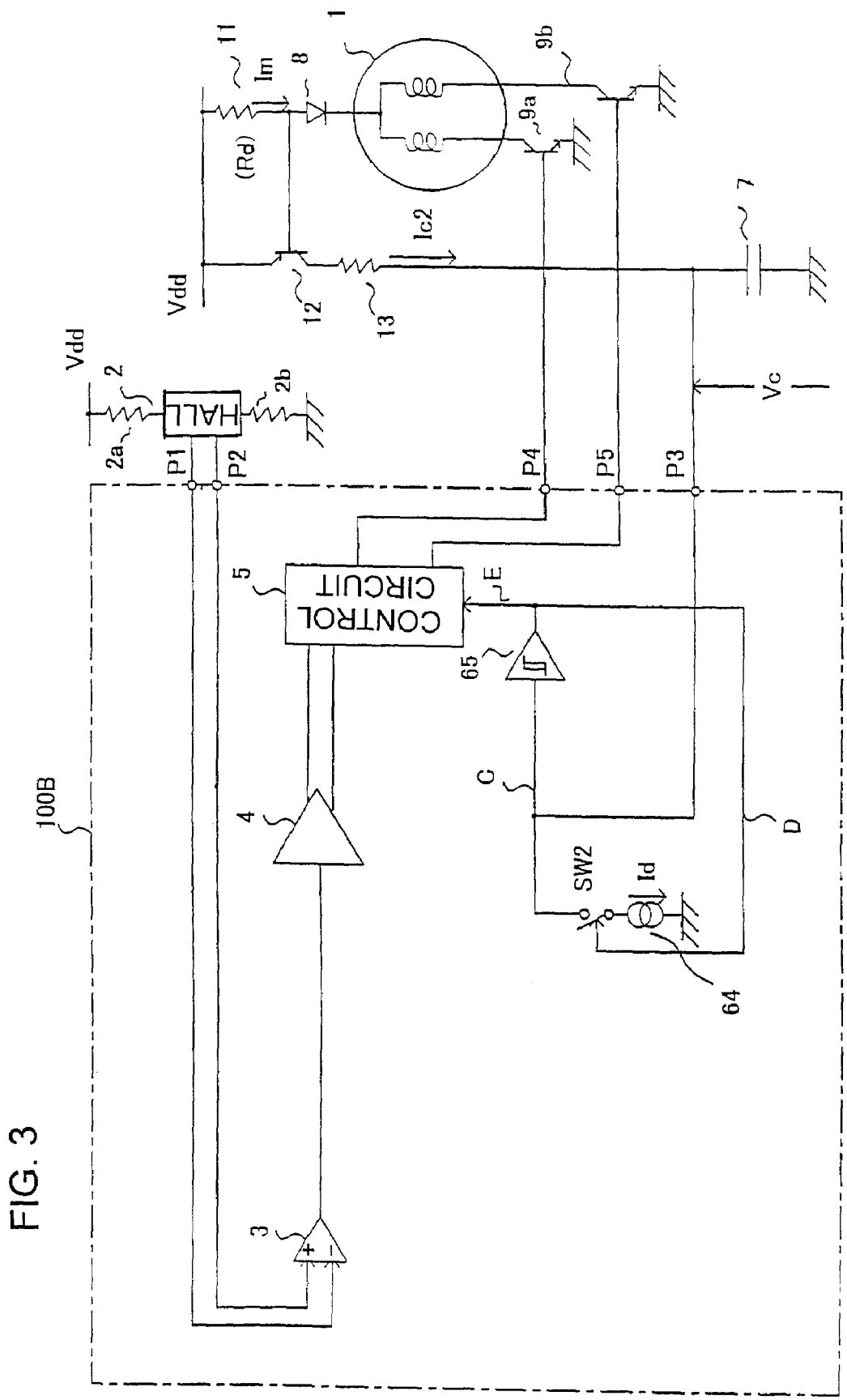
FIG. 3 shows the arrangement of a motor drive unit in accordance with a second embodiment of the invention.

Referring to FIG. 3, there is shown an arrangement of a motor drive unit in accordance with a second embodiment of the invention. As seen in FIG. 3, this motor drive unit is not provided with the first charging-discharging circuit of FIG. 1, that is, not provided with the pulse generation circuit 61, first constant current circuit 63, and first switch SW1 of FIG. 1. Because of this difference, the IC of FIG. 3 is identified by reference numeral 100B.

Charging of the capacitor 7 of the second embodiment shown in FIG. 3 is carried out solely by the charging current Inc.

As seen in FIG. 3, should the motor 1 be accidentally locked up, the motor drive current Im increases and turns on a PAP transistor 12. As a consequence, the capacitor 7 is charged by the charging current Inc., and, as the charge voltage Vc reaches the operational threshold level of the comparison circuit 65, the comparison output D of the comparison circuit 65 as well as the automatic return signal E will be raised to H level, which causes the motor drive unit to enter a dormant period Toff. Subsequent operation of the unit is the same as that described in connection with the motor drive unit shown in FIGS. 1 and 2.

It is noted that the charging current Ic1 of FIG. 1 is not involved in FIG. 3 and hence the length of the startup trial period of the motor drive unit shown in FIG. 3 is determined solely by the charging current Inc., so that it is easy to choose a resistor 13 having a resistance suitable for the type of the motor 1 used. This embodiment can attain the same results as the first embodiment of FIG. 1.

The motor drive unit of the invention can be applied to detect and overcome a lock-up condition, and automatically restore a normal operating condition of a wide range of electric motors including a fan motor provided in a computer, a switchboard, and a printer.

The invention claimed is:

1. A motor drive unit adapted to generate a motor drive signal for driving a motor when said motor is in rotational motion, but, when a motor lock-up condition of said motor is detected, stop said motor drive signal in dormant periods and generate said motor drive signal in startup trial periods, said startup trial periods interlaced with said dormant periods, said motor drive unit characterized by comprising:
  a capacitor, which is charged or discharged to generate a voltage signal in accord with the electric charge stored in said capacitor;
  a hysteresis-type comparator for generating a comparison output upon detection of said voltage signal reaching a predetermined threshold level;
  a first charging circuit for charging said capacitor with first charging current when the drive current supplied to said motor has exceeded a predetermined level; and
  a first discharging circuit for discharging said capacitor with said first discharging current based on said comparison output, and characterized in that
  said dormant periods being periods in which said comparison output is generated, and said startup trial periods being periods in which said comparison output is not generated.

2. A motor drive unit adapted to generate a motor drive signal for driving a motor when said motor is in rotational motion, but, when a motor lock-up condition of said motor is detected, stop said motor drive signal in dormant periods and generate said motor drive signal in startup trial periods, said startup trial periods interlaced with said dormant periods, said motor drive unit characterized by comprising:
  a capacitor, which is charged or discharged to generate a voltage signal in accord with the electric charge stored in said capacitor;
  a hysteresis-type comparator for generating a comparison output upon detection of said voltage signal reaching a predetermined threshold level;
  a first charging and discharging circuit for charging said capacitor with second charging current and for discharging said capacitor in cycles of a period that is in accord with the rotational speed of said motor when said motor is in a rotational motion before the charge voltage of said capacitor reaches said threshold level;
  a first charging circuit for charging said capacitor with first charging current when said motor drive current has exceeded a predetermined level; and
  a first discharging circuit for discharging said capacitor with said first discharging current based on said comparison output, and characterized in that
  said dormant periods are those periods in which said comparison output is generated, and said startup trial periods are those periods in which said comparison output is not generated.

3. The motor drive unit in accordance with claim 1, wherein said motor lock-up condition is detected based on said comparison output generated during driving of said motor.

4. The motor drive circuit in accordance with claim 1, characterized in that said first charging circuit includes
  a voltage dropping circuit for generating a voltage drop associated with the drive current supplied to said motor;
  a switching circuit switched by a voltage in accord with said voltage drop; and
  a current regulation circuit connected in series with said switching circuit, and adapted to regulate said first charging current.

5. The motor drive unit in accordance with claim 4, characterized in that
  said voltage dropping circuit has a resistor;
  said switching circuit has a transistor; and
  said current regulation circuit has a resistor.

6. The motor drive unit in accordance with claim 1, characterized in that said first charging circuit includes
  a voltage dropping circuit for generating a voltage drop in accordance with the drive current supplied to said motor; and
  a constant-current source switchable by a voltage associated with said voltage drop to supply said first charging current.

7. The motor drive unit in accordance with claim 1, characterized in that said first discharging circuit has a constant current circuit for supplying said first discharging current.

8. The motor drive unit in accordance with claim 1, characterized in that said comparison circuit and first discharging circuit are built in one semiconductor integrated circuit (IC), and that said capacitor and said first charging circuit are provided outside said IC.

9. The motor drive unit in accordance with claim 2, characterized in that said comparison circuit, first charging-discharging circuit, and first discharging circuit are built in one semiconductor integrated circuit (IC), and that said capacitor and first charging circuit are provided outside said IC.

10. The motor drive unit in accordance with claim 2, wherein said motor lock-up condition is detected based on said comparison output generated during driving of said motor.

11. The motor drive circuit in accordance with claim 2, characterized in that said first charging circuit includes
- a voltage dropping circuit for generating a voltage drop associated with the drive current supplied to said motor;
- a switching circuit switched by a voltage in accord with said voltage drop; and
- a current regulation circuit connected in series with said switching circuit, and adapted to regulate said first charging current.

12. The motor drive unit in accordance with claim 11, characterized in that
- said voltage dropping circuit has a resistor;
- said switching circuit has a transistor; and
- said current regulation circuit has a resistor.

13. The motor drive unit in accordance with claim 2, characterized in that said first charging circuit includes
- a voltage dropping circuit for generating a voltage drop in accordance with the drive current supplied to said motor; and
- a constant-current source switchable by a voltage associated with said voltage drop to supply said first charging current.

14. The motor drive unit in accordance with claim 2, characterized in that said first discharging circuit has a constant current circuit for supplying said first discharging current.

* * * * *